2,796,380

FAT-SOLUBLE VITAMIN COMPOSITIONS AND PREPARATION THEREOF

Horace P. Maietta, Rensselaer, N. Y., assignor to Sterling Drug Inc., New York, N. Y., a corporation of Delaware No Drawing. Application May 22, 1953,
Serial No. 356,896

11 Claims. (Cl. 167—81)

This invention relates to compositions of matter for enriching food products with fat-soluble vitamins and to their preparation. More particularly, said compositions are stable, dry, free-flowing preparations comprising small, solid, spheroidal particles of an alkanol having 16 to 18 carbon atoms, said particles containing one or more fat-soluble vitamins.

Fortification of human and animal foods with fat-soluble vitamins, especially vitamins A and D, has been a problem of real concern to those in the food and pharmaceutical industries. Only limited success has been attained in producing fat-soluble vitamin preparations to be used for enriching human and animal foodstuffs. This is true because it has been difficult to obtain a fat-soluble vitamin preparation that is stable per se and to prepare such a vitamin preparation of the proper consistency that can be uniformly distributed throughout the foodstuff to be enriched. In addition, the fat-soluble vitamins in the foodstuffs thus enriched must remain stable until the food is consumed.

An object of this invention therefore is to provide a stable, dry, free-flowing preparation comprising one or more fat-soluble vitamins.

Another object of the invention is to provide a fat-soluble vitamin preparation that can be used to make various enrichment compositions, e. g., tablet, capsule and dry formulations, to be added to human and animal foodstuffs.

A further object of the invention is to provide a stable, dry, free-flowing, fat-soluble vitamin preparation that can be used in the preparation of enriched food products containing one or more fat-soluble vitamins uniformly distributed throughout the products.

Previous procedures used for preparing dry, free-flowing, fat-soluble vitamin preparations have been cumbersome, costly and time-consuming. One general method has been the "centrifugal" process, that is, rapid rotation in a large cool chamber of a perforated vessel containing the mixture of ingredients in molten condition, whereby the molten ingredients are ejected as droplets which solidify during their passage through the chamber. Another procedure generally used has been the forming of spheroidal particles by passing the molten mixture of ingredients through a spray gun or similar spraying device into a large cooled chamber. Other procedures involve the use of mechanical powdering devices whereby the possibility of destruction of vitamin activity is enhanced. Still other methods depend upon the use of organic solvents from which complete recovery of the vitamins is difficult to effect. The difficulties and disadvantages encountered in these prior methods are obviated by my simplified method of making the stable, dry, free-flowing preparation of my invention.

Therefore, another object of my invention is to provide a simplified, improved method of preparaing a free-flowing, fat-soluble vitamin-containing preparation.

The method of making my free-flowing preparation comprises the steps of mixing with stirring a molten, fat-soluble vitamin-containing solution of an alkanol having 16 to 18 carbon atoms with at least two volumes of water having approximately the same temperature as the molten alkanol solution, allowing the mixture to cool with stirring, separating the resulting small, solid, spheroidal particles of vitamin-containing alkanol from the main body of water and drying the spheroidal particles.

The temperature of the alkanol solution and the water before mixing are, of course, above the melting point of the alkanol. Temperatures greatly in excess of the melting point of the alkanol are unnecessary although they can be used provided caution is exercised to prevent undue decomposition of the fat-soluble vitamins.

The water and molten alkanol solution can be mixed either by adding the alkanol solution to the water or the water to the alkanol solution.

I have used preferably about three volumes of water to one volume of alkanol solution. However, as little as two volumes of water per volume of alkanol solution can be used, although there is a tendency for the alkanol to cake at the surface of the aqueous mixture when the ratio of water to alkanol is two and one-half to one and lower, e. g., two to one. More than three volumes of water per volume of alkanol solution, although unnecessary, can be used with equally satisfactory results.

For best results, the water used should be purified, that is, distilled or deionized. Also, for best results, the water can contain about 0.01 to 0.5% of an edible surface active agent such as: a polyethylene oxide condensation product of partial fatty acid esters of sorbitans or mannitans, e. g., "Tween 80"; a phosphatide such as lecithin; natural gums such as gum acacia and gum tragacanth; and the like. Although I have preferred to use said minor quantity of a surface active agent in the water, my process is operable in the absence of any such agent.

During the second step of allowing the mixture to cool with stirring, the procedure can be facilitated by rapidly cooling the mixture after solid, spheroidal particles have formed. This more rapid cooling can be effected by adding ice, ice water or by chilling the mixture in a cold bath.

After precipitation of the spheroidal particles has been completed, that is, preferably after the mixture has reached room temperature or a lower temperature, the fat-soluble vitamin-containing alkanol particles are separated from the main body of water by any convenient method. For such a purpose I found as suitable the procedure of straining the mixture through muslin, drawing off as much water as possible. Alternatively, the bulk of the water can be separated from the alkanol particles by centrifugation or some other equally suitable straining means.

The drying step of my process can be effected under vacuum or in a dehumidified room at atmospheric pressure. This step can be carried out at room temperature or at temperatures up to 35–40° C. The drying is performed preferably by spreading the alkanol particles on trays in thin layers. When dry, the preparation falls apart into small, spheroidal particles at a touch. The dried product should have a low moisture content, preferably less than 1%, although moisture content up to about 2% has been found to give a satisfactory product suitable for preparing food enrichment compositions.

The small, spheroidal, free-flowing particles of my invention are not limited to any particular size, although a preferred range is from about 0.01 mm. to about 1.0 mm. in diameter. If a more narrow particles size range is desired for a particular use, the spheroidal particles may, of course, be separated into graded sizes by fractional sifting. A very limited range in the size of the spheroidal particles of my preparation is difficulit to control with any great degree of accuracy, the size being dependant primarily upon the thoroughness and rate of stirring. Also, the size of the spheroidal particles is dependent, to a limited extent, on the presence of and quantity of surface active agent in the water that is mixed with the molten alkanol solution.

In view of the relative sensitivity of fat soluble vitamins to light, heat, air and various other oxidizing agents, certain optional but preferred precautionary measures can be observed in preparing my free-flowing preparations in order to keep any loss in vitamin potency to a minimum. For example, a suitable quantity of an appropriate antioxidant can be incorporated in the molten alkanol solution together with the fat soluble vitamin or vitamins. Among such antioxidants which may be used are butylated hydroxyanisole, propyl gallate, gallic acid, mixed tocopherols, nordihydroguaiaretic acid, and the like. Another optional precautionary measure to prevent vitamin destruction during the process is flooding the molten alkanol with an inert atmosphere like carbon dioxide or purified nitrogen both before and after addition of the fat soluble vitamin or vitamins. Still another is to protect the spheroidal particles from light during the drying step. Other precautionary measures will be obvious to those skilled in the art.

The preferred embodiment for the alkanol having 16 to 18 carbon atoms is stearyl alcohol. By stearyl alcohol I mean not only the pure substance which melts at 59.4–59.8° C., but also the official stearyl alcohol described in the Fourteenth Revision of the Pharmacopeia of the United States as being "a mixture of solid alcohols consisting chiefly of stearyl alcohol, $CH_3(CH_2)_{16}CH_2OH$." This product has a melting point of 56–60° C.; and as further described in the U. S. Pharmacopeia, it "occurs as unctuous, white flakes or granules" and "has a faint, characteristic odor and a bland, mild, taste." In practicing my invention, I have preferred to use this stearyl alcohol described in the U. S. Pharmacopeia since it is just as suitable as and considerably less expensive than the purified stearyl alcohol, of M. P. 59.4–59.8° C. I can also use cetyl alcohol or mixtures of cetyl and stearyl alcohols.

Another object of my invention is to provide an enrichment tablet for fortifying food products with supplementary dietary factors, and more particularly for enriching cereal doughs and batters with one or more fat-soluble vitamins.

My enrichment tablet, which is particularly suitable for enriching bread and other baked cereal goods, is prepared from my free-flowing preparations described hereinabove. This tablet thus contains a fat-soluble vitamin, especially vitamin D, and, as a carrier for the vitamin, an alkanol having 16 to 18 carbon atoms, especially stearyl alcohol or cetyl alcohol.

Because of its wide consumption and low cost, bread is one of the most important foodstuffs to be enriched with supplemental dietary factors to help provide a diet with sufficient vitamins and minerals. For some time now, the majority of bakers have been fortifying bread with enrichment tablets that disintegrate rapidly under conditions of use. Heretofore, these tablets have contained various forms of iron, such as ferrous sulfate, and certain water-soluble vitamins, especially thiamine salts, riboflavin and nicotinic acid. However, none of these previously known tablets have ever contained a fat-soluble vitamin.

Because of the recognized importance of adding vitamin D to foods, especially for infants, children, pregnant women and lactating mothers and for the prevention of rickets, extensive efforts have been made to enrich bread with this fat-soluble vitamin. These efforts, all unsuccessful, were in part directed at formulating a satisfactory vitamin D-containing enrichment tablet.

I have now succeeded in formulating a uniform, stable, quickly disintegrating tablet that will enable the baker to produce high quality, uniformly enriched bread and other baked foodstuffs with vitamin D, as well as other dietary ingredients. With my tablet the baker can now prepare such enriched foodstuffs easily, accurately and economically.

A preferred embodiment of my invention is an enrichment tablet which includes vitamin D and stearyl alcohol as a carrier for the vitamin D.

In preparing my enrichment tablet I have used the free-flowing, fat-soluble vitamin-containing preparations comprising solid, spheroidal particles of an alkanol having 16 to 18 carbon atoms which are described above and further illustrated in Examples 1 to 4 below.

Also included in my enrichment tablet are excipients to aid in furnishing satisfactory tablet properties, such excipients including starch, talc, magnesium stearate, and the like. Moreover, there can be conveniently incorporated in my tablet other dietary factors such as the water-soluble vitamins, thiamine salts, riboflavin, nicotinic acid, and the like; and minerals such as dietary iron, dietary calcium, and the like.

My enrichment tablets are satisfactory for use in the enrichment of bread and other baked cereal goods from the standpoint of the stability of both fat-soluble and water-soluble vitamins, stability of other dietary ingredients, e. g., ferrous sulfate, and rapid disintegrative time.

My invention is further illustrated by the following examples without however being limited thereto:

*Example 1*

Stearyl alcohol U. S. P. (17.59 kg.) was melted at a temperature of about 62–65° C. Its surface was flooded with carbon dioxide and 70.0 g. of Tenox BHA (butylated hydroxyanisole) was dissolved in the molten stearyl alcohol. While the flow of carbon dioxide was discontinued momentarily to prevent currents of gas from carrying off the vitamin $D_2$, 337.5 g. of crystalline vitamin $D_2$ (13,500 Standard Units) was added with stirring and the surface of the molten solution was then reblanketed with carbon dioxide. This molten solution was stirred sufficiently to obtain homogeneous distribution, while the temperature was kept at about 60–62° C. The molten solution was then added with stirring to three volumes of deionized water heated to about 60–62° C. When the temperature of the resulting mixture dropped to about 55° C., it became turbid. At this point, the rate of stirring was increased while small, spheroidal particles of solid stearyl alcohol containing vitamin $D_2$ and the antioxidant formed. The mixture was allowed to cool with continued stirring until the spheroidal particles hardened sufficiently to permit handling. The mixture was then strained through two layers of muslin and as much water as possible was drained off. The spheroidal particles were then dried under vacuum at room temperature. The dried product fell apart into small, spheroidal particles at a touch.

*Example 2*

A solution of 3.75 g. of crystalline vitamin $D_2$ and 0.75 g. of Tenox BHA in 195.5 g. of stearyl alcohol U. S. P. was prepared as described above in Example 1. To this solution, kept at about 60–62° C., was added with stirring three volumes of deionized water heated to 65° C. and containing 0.02% Tween 80 (polyoxyethylene sorbitan monooleate). Stirring was continued while the mixture was allowed to cool. Spheroidal particles formed at about 58° C. When the temperature had dropped to 55° C., a thin stream of cold water (about 100 ml.) was added with continuous stirring. After the temperature had dropped to about room temperature, the spheroidal particles were separated from the bulk of the water by straining through muslin and were dried in a dehumidified room having a relative humidity of 15–18%. The resulting dried product contained less than 1% water.

A sample of the product was assayed for vitamin D content and found to contain about the theoretical amount of vitamin D. In order to determine the stability of this preparation under adverse conditions, a sample was stored at 37° C. in a screw-top, amber glass container without the protection of an inert gas. As seen from the following results, the product stood up well in spite of the adverse storage conditions.

| When Assayed | Vitamin D₂, Units/gram |
| --- | --- |
| Originally | 764,000 |
| 1 Month at 37° C | 736,000 |
| 2 Months at 37° C | 692,000 |
| 3 Months at 37° C | 632,000 |

In order to determine if this preparation was hygroscopic, a sample was allowed to stand over concentrated sulfuric acid for one week and then placed in a humidity jar having a relative humidity of 79.3% at 25° C. The sample was reweighed at intervals. Results are tabulated as follows:

Weight of dish and dried sample _____g__ 63.30
Weight of dish _____g__ 53.30
Weight of dish and sample after 24 hours ____g__ 63.30
Weight of dish and sample after 48 hours ____g__ 63.30
Weight of dish and sample after 1 week _____g__ 63.30

Thus, under the adverse conditions of the test, the sample took up no moisture.

The above-described procedure for preparing my free flowing, fat soluble vitamin-containing preparation can be modified in various ways and still result in a satisfactory product that comes within the scope of my invention. Such modifications are described in the following paragraphs.

The essential ingredients, i. e., vitamin D₂ and stearyl alcohol, can be substituted, respectively, by other fat soluble vitamins and alkanols as hereinabove described. Thus, in place of vitamin D₂, there can be used vitamin D₃, vitamin A, alpha-tocopherol or other fat soluble vitamins. Moreover, more than one of these fat soluble vitamins can be used if desired. Similarly, a satisfactory product was obtained when cetyl alcohol was used in the above procedure in place of stearyl alcohol. If desired, a mixture of stearyl and cetyl alcohols can be used. The quantity of alkanol, i. e., stearyl alcohol, cetyl alcohol, or mixture of alkanols can be varied; however, best results were obtained when the total alkanol percentage in the final, free-flowing product was at least 75%, preferably at least 85%. Thus, the quantities of the fat soluble vitamins and other ingredients can be varied over rather wide ranges and still result in a satisfactory product.

Other ingredients, such as the antioxidant ("Tenox BHA" above) and the surface active agent ("Tween 80" above) can be omitted or substituted by other antioxidants or surface active agents, respectively.

Quantities of ingredients for other preparations that were prepared following the above procedure are given as follows:

| | Vitamin D₂, g. | Antioxidant | Stearyl Alcohol, g. |
| --- | --- | --- | --- |
| (a) | 1.875 | 0.375 g. BHA | 97.75 |
| (b) | 1.875 | 0.375 g. n-Propyl Gallate | 97.75 |
| (c) | 3.75 | None | 196.25 |
| (d) | 1.5 | 0.3 g. BHA | 148.2 |
| (e) | 1.925 | 0.4 g. Mixed Tocopherols | 37.6 |

In preparations a–d, three volumes of water per volume of molten alkanol solution were used and in preparation e, two and one-half volumes of water per volume of alkanol solution were used.

Whenever the foregoing procedure was carried out using only from two and one-half to two volumes of water per volume of molten alkanol solution, a satisfactory free-flowing preparation was obtained; however, the products so obtained were irregular with respect to shape and size of particle. It was observed that with these preparations using less water, that is from two and one-half to two volumes of water per volume of alkanol solution, there resulted a marked tendency of the alkanol to solidify into a thin layer at the liquid-air interface, even with vigorous stirring.

A variation in the method of separating the product from the bulk of the water was effected by centrifugation as follows: The preparation was carried out following the above procedure but using one-half the quantities of the various ingredients. The centrifuge used was equipped with a perforated, five inch stainless steel basket having a capacity of 0.3 kg. The centrifuge was run at maximum speed (3600 R. P. M.) for about fifteen minutes after it had been charged with the mixture. The product that remained in the basket weighed about 112 g. (thus still containing about 12 g. of water). The stearyl alcohol particles were not pressed into a solid cake, nor were the individual particles flattened. Subsequent drying of this centrifuged product under vacuum or in a dehumidified room yielded a satisfactory free-flowing product.

Variations in the quantity of surface active agent used appeared to have some slight effect on the size of the spheroidal particles obtained. Thus, in the above preparation when three volumes of water containing 0.02% Tween 80 was used, 50% of the product passed through a 40 mesh screen and when three volumes of water containing 0.01% Tween 80 was used, 35% of the product passed through a 40 mesh screen. In each preparation, 100% of the product passed through a 24 mesh screen. Of course, as noted above, a suitable product can also be obtained by using no surface active agent.

*Example 3*

A molten solution containing 192.8 g. of stearyl alcohol U. S. P., 7.0 g. of crystalline vitamin A acetate and 0.20 g. of Tenox BHA was prepared as described in Example 1. To this stirred molten solution, kept at 65° C., was added an aqueous solution, also at 65° C., containing 600 ml. of deionized water, 0.3 g. of sodium citrate, 0.3 g. of citric acid and 0.12 ml. of polyoxyethylene (20) sorbitan monooleate. The mixture was allowed to cool with stirring. After solid, spheroidal particles had separated at about 58° C., about 50 ml. of ice water was poured into the mixture with continuous stirring until the temperature dropped to about 35° C. The spheroidal particles were separated from the water by straining through muslin and were dried under vacuum at room temperature. The resulting product contained 0.5% water and passed (100%) through a No. 24 mesh screen.

A sample of this product was assayed for vitamin A content and found to contain 98,600 units per gram (Theory: 100,000 units per gram). This same sample after standing for one month at 37° C. in a screw cap, amber bottle without protection of inert gas had 92,000 units per gram of vitamin A.

The foregoing procedure can be carried out but using cetyl alcohol in place of stearyl alcohol.

*Example 4*

To a stirred molten solution (prepared as described in Example 1) containing 27.4 g. of vitamin A natural ester (100,000 units per gram), 0.069 g. of vitamin D₂, 0.345 Tenox BHA and 109.2 g. of stearyl alcohol U. S. P. and heated to 60–65° C. is added approximately 400 ml. of water containing 0.25 g. of citric acid and 0.25 g. of sodium citrate and heated to 65° C. The mixture was allowed to cool with continuous stirring whereupon solid, spheroidal particles separated. After the mixture had been allowed to cool to room temperature, the spheroidal particles were collected by straining through a double layer of washed, unbleached muslin and then dried in vacuo.

Example 5

A satisfactory tablet for bread enrichment was prepared using the free-flowing, vitamin $D_2$-containing stearyl alcohol preparation described in Example 2. This preparation, which is designated below as "vitamin $D_2$ in stearyl alcohol," was found to contain 764,000 units of vitamin $D_2$ per gram. The enrichment tablet prepared contained the following quantities of enrichment factors and other ingredients:

|  | Grams |
|---|---|
| Thiamine hydrochloride | 0.125 |
| Riboflavin | 0.035 |
| Nicotinic acid | 0.900 |
| Vitamin $D_2$ in stearyl alcohol | 0.103 |
| Ferrous sulfate (30% iron) | 1.717 |
| Sodium iron pyrophosphate | 0.630 |
| Talc | 0.400 |
| Magnesium stearate | 0.035 |
| Starch | 3.055 |
|  | 7.000 |

Such a tablet was used successfully to enrich fifty pounds of flour for bread. Tablets of this formulation were found to have a rapid disintegrative time, i. e., from 30 to 60 seconds, to possess the originally introduced quantities of vitamin $D_2$, ferrous iron and other vitamins and to have satisfactory physical characteristics regarding appearance, absence of undue breakage, etc., not only immediately after preparation but also when kept for sixty days and longer at room temperature.

The vitamin $D_2$ stability of these tablets is given as follows:

| When assayed | Vitamin $D_2$, Units/gram |
|---|---|
| Originally | 75,000 |
| 1 Month at room temperature | 74,000 |
| 2 Months at room temperature | 73,600 |

In the above formulation the amount of vitamin $D_2$-containing alkanol preparation can be increased up to about 10% by weight of the tablet, if desired, by decreasing the quantities of other ingredients accordingly, in particular, the talc, magnesium stearate or starch. For best results, however, I have found that the preferred quantity of free-flowing, vitamin $D_2$-containing stearyl alcohol preparation is up to about 2% by weight of the total weight of the tablet.

Example 6

Enrichment tablets can be formulated as above in Example 5 but using in place of the vitamin $D_2$-containing stearyl alcohol preparation other free-flowing, fat-soluble vitamin-containing preparations as described in the specification hereinabove and as illustrated by Examples 2–4, such other preparations including vitamin $D_2$ in cetyl alcohol, vitamin $D_3$ in stearyl alcohol, vitamin A in stearyl alcohol, alpha-tocopherol in stearyl alcohol, and the like.

Example 7

The ratios of the other ingredients of the enrichment tablets can be varied within rather wide limits while still yielding a satisfactory tablet, although perhaps not equally satisfactory in all respects. Thus, in an enrichment tablet of a given weight, the weight percentages of other enrichment factors can range as follows: thiamine hydrochloride, up to 3%; riboflavin, up to 2%; nicotinic acid, up to 20%; and ferrous sulfate, up to 50%. In addition, the percentages of starch and talc can vary up to 50% and 10%, respectively. Thus, a tablet with larger proportions of enrichment factors can contain the following ingredients:

|  | Grams |
|---|---|
| Thiamine hydrochloride | 0.190 |
| Riboflavin | 0.085 |
| Nicotinic acid | 1.200 |
| Vitamin $D_2$ in stearyl alcohol | 0.200 |
| Ferrous sulfate (30%) | 3.000 |
| Sodium iron pyrophosphate | 0.700 |
| Talc | 0.400 |
| Magnesium stearate | 0.070 |
| Starch | 1.155 |
|  | 7.000 |

Example 8

A tablet to be added to fifty pounds of semolina for enrichment of macaroni products may contain the following ingredients:

|  | Grams |
|---|---|
| Thiamine hydrochloride | 0.200 |
| Riboflavin | 0.085 |
| Nicotinic acid | 1.250 |
| Vitamin $D_2$ in stearyl alcohol | 0.350 |
| Ferrous sulfate (30%) | 1.833 |
| Ferric orthophosphate | 0.500 |
| Talc | 0.400 |
| Magnesium stearate | 0.070 |
| Starch | 2.312 |
|  | 7.000 |

I claim:

1. In the process of making a free-flowing, fat-soluble vitamin-containing preparation, the steps comprising mixing with stirring a molten, fat-soluble vitamin-containing solution of an alkanol having 16 to 18 carbon atoms with at least two volumes of water having approximately the same temperature as the molten alkanol solution, allowing the mixture to cool with stirring, separating the resulting solid, spheroidal particles of vitamin-containing alkanol from the main body of water and drying the spheroidal particles.

2. In the process of making a free-flowing, fat-soluble vitamin-containing preparation, the steps comprising mixing with stirring a molten, fat-soluble vitamin-containing solution of stearyl alcohol with at least two volumes of water having approximately the same temperature as the molten alcohol solution, allowing the mixture to cool with stirring, separating the resulting solid, spheroidal particles of vitamin-containing alcohol from the main body of water and drying the spheroidal particles.

3. In the process of making a free-flowing, vitamin D-containing preparation, the steps comprising mixing with stirring a molten, vitamin D-containing solution of stearyl alcohol with at least two volumes of water having approximately the same temperature as the molten alcohol solution, allowing the mixture to cool with stirring, separating the resulting solid, spheroidal particles of vitamin D-containing alcohol from the main body of water and drying the spheroidal particles.

4. In the process of making a free-flowing, vitamin D-containing preparation, the steps comprising mixing with stirring a molten, vitamin D-containing solution of cetyl alcohol with at least two volumes of water having approximately the same temperature as the molten alcohol solution, allowing the mixture to cool with stirring, separating the resulting solid, spheroidal particles of vitamin D-containing alcohol from the main body of water and drying the spheroidal particles.

5. In the process of making a free-flowing, vitamin A-containing preparation, the steps comprising mixing with stirring a molten, vitamin A-containing solution of stearyl alcohol with at least two volumes of water having approximately the same temperature as the molten alcohol solution, allowing the mixture to cool with stirring, separating the resulting solid, spheroidal particles of vitamin A-containing alcohol from the main body of water and drying the spheroidal particles.

6. In the process of making a free-flowing, vitamin D-containing preparation, the steps comprising adding with stirring to a molten, vitamin D-containing solution of stearyl alcohol about three volumes of water having approximately the same temperature as the alcohol solution, allowing the mixture to cool with stirring, separating the resulting solid, spheriodal particles of vitamin D-containing alcohol from the main body of water and drying the spheroidal particles.

7. In the process of making a free-flowing, vitamin $D_2$-containing preparation, the steps comprising adding with stirring to a molten, vitamin $D_2$-containing solution of stearyl alcohol about three volumes of water having approximately the same temperature as the alcohol solution, allowing the mixture to cool with stirring, separating the resulting solid, spheroidal particles of vitamin $D_2$-containing alcohol from the main body of water and drying the spheroidal particles.

8. In the process of making a free-flowing, vitamin A-containing preparation, the steps comprising adding with stirring to a molten, vitamin A-containing solution of stearyl alcohol about three volumes of water having approximately the same temperature as the alcohol solution, allowing the mixture to cool with stirring, separating the resulting solid, spheroidal particles of vitamin A-containing alcohol from the main body of water and drying the spheroidal particles.

9. A fat-soluble vitamin preparation comprising solid, free-flowing, spheroidal particles formed by mixing with stirring a molten, fat-soluble vitamin-containing solution of an alkanol having 16 to 18 carbon atoms with at least two volumes of water having approximately the same temperature as the molten alkanol solution, allowing the mixture to cool with stirring, separating the resulting solid, spheroidal particles of vitamin-containing alkanol from the main body of water and drying the spheroidal particles.

10. A preparation according to claim 9 in which the alkanol is stearyl alcohol.

11. A preparation according to claim 9 in which fat-soluble vitamin is vitamin $D_2$.

References Cited in the file of this patent

UNITED STATES PATENTS

| 1,638,700 | Molofsky | Aug. 9, 1927 |
| 2,206,113 | Nitardy | July 2, 1940 |
| 2,470,804 | Clark | May 24, 1949 |
| 2,685,517 | Dunmire | Aug. 3, 1954 |

FOREIGN PATENTS

| 454,386 | Germany | Jan. 6, 1928 |